Aug. 22, 1939.  O. S. PETERS  2,170,505
RECORDER APPARATUS
Filed March 26, 1935  2 Sheets-Sheet 1
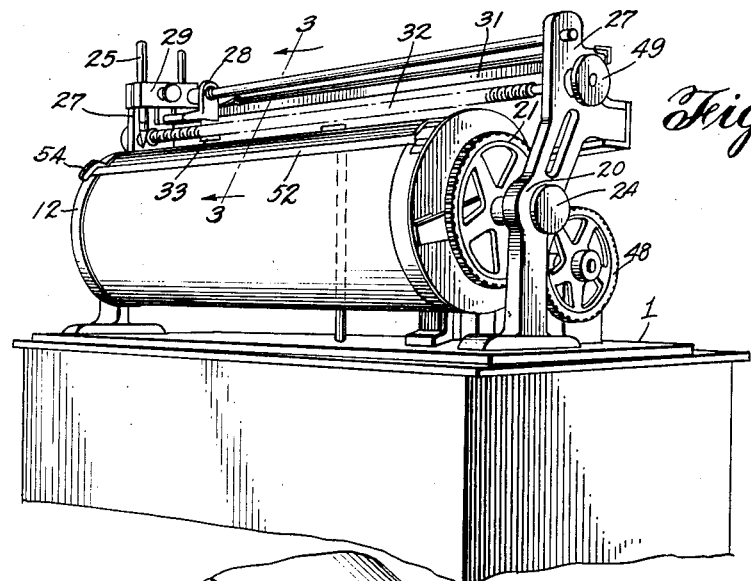
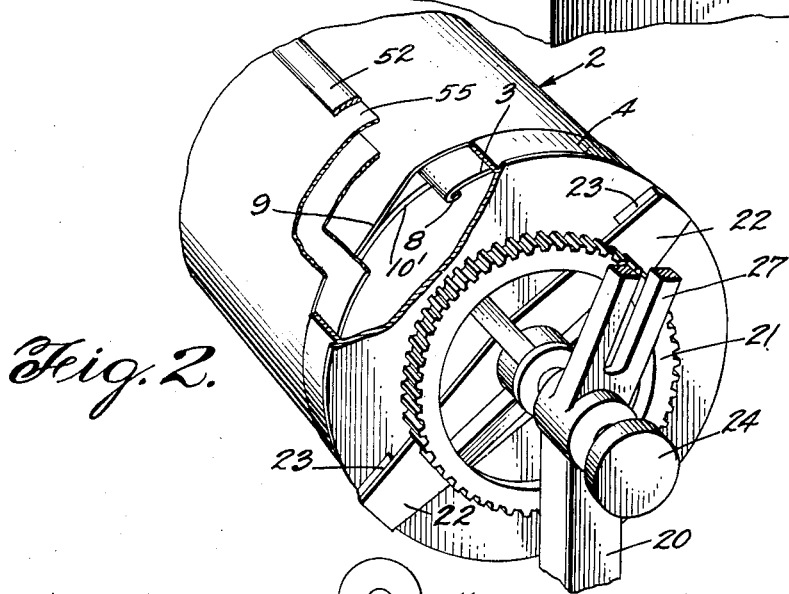
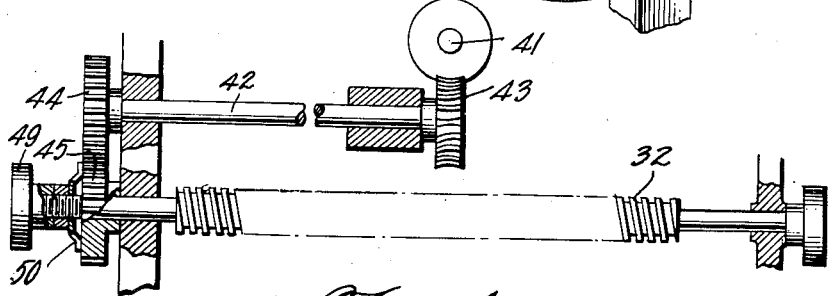
INVENTOR.
O. S. PETERS
ATTORNEY Aug. 22, 1939.  O. S. PETERS  2,170,505
RECORDER APPARATUS
Filed March 26, 1935   2 Sheets-Sheet 2
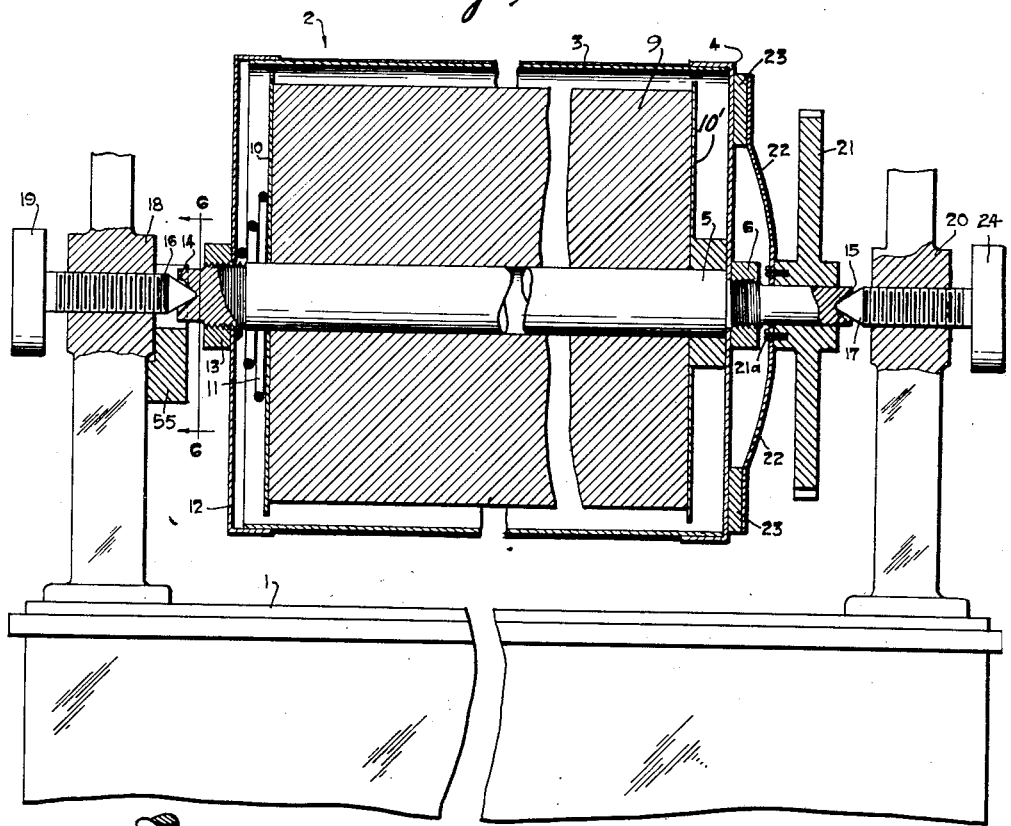
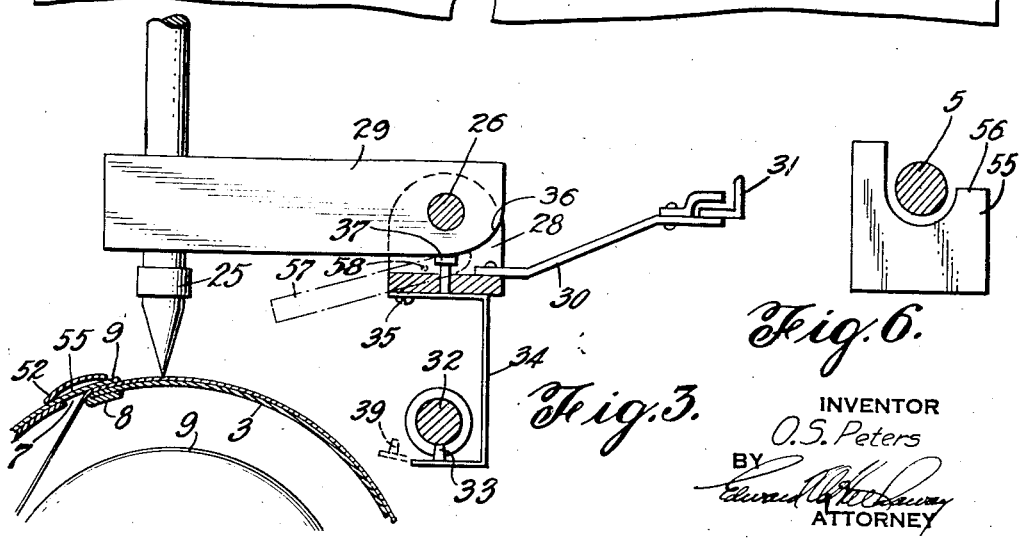
INVENTOR
O. S. Peters
BY
ATTORNEY Patented Aug. 22, 1939

2,170,505

UNITED STATES PATENT OFFICE 2,170,505

RECORDER APPARATUS

Orville S. Peters, Chevy Chase, Md., assignor to Baldwin-Southwark Corporation, a corporation of Delaware Application March 26, 1935, Serial No. 13,127

2 Claims. (Cl. 234—77)

This invention relates generally to materials testing equipment and more particularly to apparatus for recording the stress-strain relation of material stressed in a materials testing machine.

Various forms of such stress-strain apparatus, generally known as autographic recording devices, have been heretofore proposed and built, but the same have involved complications or annoyances that have deterred or limited their use, due usually to an undue length of time to prepare the record equipment for use and to substitute fresh record sheets, especially when a large number of successive tests are being made.

It is one object of my invention to provide an improved combination for an autographic recording apparatus whereby fresh record sheets may be conveniently and expeditiously placed in use while at the same time effectively obtaining the proper cooperative relation between the record sheet and the automatic mechanism for operating the apparatus in accordance with stress and strain of a specimen.

A further object is to provide an improved combination as above described that will be relatively economical in manufacture, maintenance and operation, that will allow minimum amount of record paper to be used consistent with desired results, that will be positive and yet flexible in operation and adjustment without sacrifice of the precision qualities of such apparatus and that will be compact and yet readily accessible for inspection and repair.

I have found that the foregoing objects can be obtained most efficiently by utilizing in one specific aspect of the invention a frictionally driven recorder drum so formed and mounted as not only to receive and house a roll of record paper but also to permit the same to be unwound over the exterior of the drum and clamped thereto in such a manner that successive portions of the record paper may be easily and effectively torn off, that the paper may be maintained taut over the drum surface and that a predetermined ordinate line may be brought into precise operative relation to the recording stylus.

Other objects and advantges will be more apparent to those skilled in the art from the following description of the accompanying drawings in which—

Fig. 1 is a perspective of a recording apparatus embodying my invention;

Fig. 2 is an enlarged perspective of the recording drum and certain of the associated driving mechanism therefor partly broken away to show details of construction;

Fig. 3 is an enlarged transverse section of the means for driving and adjusting the stylus taken substantially on the line 3—3 of Fig. 1;

Fig. 4 is a diagrammatic plan view of the driving connections;

Fig. 5 is a longitudinal section of the recorder drum;

Fig. 6 is a vertical section taken on line 6—6 of Fig. 5.

In the particular embodiment of the invention which is shown herein merely for the purpose of illustrating one specific form among possible others that the invention might take in practice, I have provided a stress-strain recorder having a base 1. This base may contain any suitable automatic control equipment operated in response to stress and strain of a specimen, one suitable form of such mechanism being shown in patents of O. S. Peters and G. S. von Heydekampf, No. 2,081,598, and O. S. Peters, No. 2,081,599. For purposes of specific reference and illustration, it will be considered herein that the mechanism of either one of said patents is used in this application, although the same is not disclosed herein because it does not constitute a part of the present invention. A recorder drum generally indicated at 2 is formed preferably as a sheet metal cylinder 3, Fig. 5, having one end permanently secured to a flanged end cover 4. This cover is secured to shaft 5 in any suitable manner although it is specifically shown as being held by a nut 6 which clamps the cover against a shoulder on said shaft. As shown in Fig. 2, the drum is provided with a longitudinal peripheral slot generally indicated at 7, one edge of the slot being of the same thickness as the sheet metal and the adjacent edge being turned back underneath as generally indicated at 8 to provide a smooth inclined surface over which the record paper is unwound from a paper roll 9. This roll is supported upon shaft 5 and is urged to one end of the drum by a pressure plate 10 slidably supported on shaft 5 and held against the roll by any suitable spring specifically shown as a spiral coil 11 which abuts against a removable end cover 12. The right end of the paper roll (Fig. 5) bears against the element 10' spaced from the ends of the drum. End cover 12 is provided with a flanged portion to telescopically receive the end of drum 3 and is held in position by a nut 13 threaded on shaft 5. It is thus seen that shaft 5, the roll of paper, the pressure plate and the drum structure form a self-contained drum unit. It is also preferable to include some driving mechanism as part of the self-contained unit as will be presently described.

To support the drum unit, the ends of shaft 5 are provided with conical recesses 14 and 15 to receive tapered ends of screws 16 and 17. The shaft 16 is adjustably threaded in a suitable bracket 18 supported on the top of base 1. A hand grip 19 permits adjustment of screw 16 to release the drum. The shaft 17 is adjustably threaded in a bracket 20 supported on base 1. Supported on shaft 5 in such manner as to permit rotation thereon are a driven gear 21 and friction driving means comprising preferably a pair of diametrical spring arms 22 secured to gear 21 by screws 21a or other suitable means. These arms are provided with friction elements such as cork faces 23 engaging end cover 4. A hand grip 24 is formed integrally with screw 17. From the foregoing it is seen that gear 21 and the drum are rotated as a unit on the tapered ends of the screws with resultant minimum frictional resistance, thus insuring maximum accuracy in the transmission to the drum of factors to be recorded. In addition the self-contained unit may be bodily removed without disturbing the relative relation of the driving parts.

As shown in Figs. 1, 3 and 4 there is mounted over the top of the drum a stylus or pencil 25 and operating mechanism therefor. This mechanism includes a guide shaft 26 secured in brackets 27 which extend upwardly and rearwardly from the brackets 18 and 20. Slidably supported on shaft 26 is a U-bracket 28 within which a stylus arm 29 is disposed and is also slidably and pivotally mounted on the shaft. The stylus 25 is suitably mounted in the outer end of arm 29. To prevent rotation of bracket 28 there is provided an arm 30 extending rearwardly and having slidable connection with an angle member 31 which extends longitudinally between the brackets 27. To move longitudinally the bracket 28 and associated elements, there is provided a screw shaft 32 and a pin or follower member 33 disposed in the threads. This pin is supported in a shiftable depending arm 34, preferably somewhat flexible, secured by a screw 35 to bracket 28. The connection between arm 34 and bracket 28 is sufficiently strong to insure axial movement of the bracket during rotation of screw 32. To adjust the stylus longitudinally along its shaft 26 independently of screw 32, there is provided a cam surface 36 on arm 29, this cam engaging a cam follower pin 37 projecting downwardly through bracket 28 to engage spring arm 34. Hence upon rotating arm 29 upwardly about shaft 26, cam 36 will press pin 37 downwardly and hence cause arm 34 to flex near screw 35 to act as a fulcrum. This results in pin 33 being moved laterally as shown in dotted lines at 39, thereby becoming free of the screw and permitting independent longitudinal adjustment of the stylus along shaft 26. When the stylus has been properly positioned, it is only necessary to lower the arm 29 whereupon arm 34 will spring the pin 33 back into engagement with the threads of shaft 22. Hence it is seen that multiple functions are performed by the single movement of the arm 29, one function being the removal of the stylus from the recording drum and the other the disengagement of the driving connection for the stylus.

To rotate screw shaft 32, a suitable power driven vertical shaft 41 extends upwardly from base 1. This shaft drives a worm and pinion gear 43, a horizontal shaft 42, gears 44 and 45 and a friction drive 50 secured to screw shaft 32 thereby to rotate the same in response and in proportion to strain of the specimen.

The drum is operated preferably in response to stress of the specimen and to accomplish this I employ the operating mechanism such as shown in said Peters' application except instead of transmitting power to the drum through a string drive I employ a gear drive including a gear 48 for driving the gear 21. This latter gear in turn rotates friction arms 22 so as to rotate the drum in proportion to stress. It will of course be understood that the drum could be rotated in accordance with strain and the stylus moved in accordance with stress if so desired.

*Operation.*—It will be assumed that the materials testing machine and specimen are fully set up therein and connected to the recording apparatus so that strain of the specimen controls power operation of shaft 41 and the stress controls operation of gears 48 and 21. The stylus arm 29 will then be raised by the operator so as to free pencil 25 from the record drum and release pin 33 from screw shaft 32, whereupon the stylus will be moved to the left to a starting position as shown in Fig. 1. A fresh record sheet, if such is necessary, can now be pulled upon the drum by first lifting a holding down bar 52, one end of which is freely disposed in a socket 53 supported on the flange of end cover 4 and the other end of which is preferably frictionally held beneath a yieldable clip 54 secured on the flange of the other end cover 12. Clip 54 has one end open so that bar 52 can be moved in a circumferential direction beneath the clip 54. The holding down bar preferably overlies slot 7 so as to hold down the paper on each side of the slot, thereby insuring that each successive portion of paper is uniformly held on the drum surface. With the end of the bar 52 removed from clip 54, the end 55 of the paper can be taken hold of by the fingers and pulled until a sufficient amount of fresh paper has been unwound from roll 9, the paper passing over edge 8 and around the drum and under the partially removed holding bar, after which bar 52 is placed in its holding position as shown in Fig. 2 and the loose end of the paper then torn off by using bar 52 as a tearing edge. Thus in the single operation a new portion of sheet is tautly drawn over the drum and the old portion of sheet moved to a tearing off position. It will often happen after providing a fresh portion of the record sheet that the stylus does not fall upon a predetermined ordinate line at which it is desired to start the record. To obtain this desired cooperative relation, it is only necessary for the operator to rotate the drum 3 with his fingers, during which time the frictional arms 22 allow slippage so that the drum rotates independently of the gear transmission 48 and 21. Or if desired, suitable markings may be placed on the flange or flanges of the end cover to indicate that when an ordinate line is opposite such markings, then the stylus will initially rest on that ordinate line. In such case, the paper would be pulled around the drum until the ordinate line and end marking are in register. To adjust the stylus to any predetermined abscissae line, either one of knobs 49 secured to the opposite ends of screw 32 is turned with the fingers thereby rotating screw 32 to move the stylus carriage with the stylus to any desired position. Screw 32 is frictionally held by spring finger 50 to gear 45 which slips when turned but without disturbing the gears.

After the roll 9 of record paper has been completely used, the operator may substitute a new roll by grasping hand grip 19 and rotating screw 16 to release its tapered end from recess 14, Fig. 5, whereupon the drum unit is bodily moved laterally from its frame. A recessed ledge 55 (Fig. 6) having a laterally relieved side 56 permits shaft 5 to be momentarily supported while adjusting screw 16. The nut 13 and end cover 12 are then removed from shaft 5 together with the spring 11 and pressure plate 10. The holding bar 52 is likewise removed. A new roll is then inserted, a portion of unrolled paper being inserted into the end of the drum slot 7 at the time when the roll is inserted within the drum. After the roll has been inserted, pressure plate 10, spring 11 and end cover 12 are placed on shaft 5 together with nut 13 to urge the roll to the right end of the drum. The drum is then inserted between the pedestals 18 and 20 and screw 16 rotated to seat in conical recess 14. The paper is then pulled around drum 3 after which holding bar 52 is pushed under clip 54 to hold the paper in position. As previously stated, if the stylus 25 does not coincide with desired ordinate and abscissae lines on the record paper, then drum 3 is partially rotated by hand against the frictional contact of friction arms 22, and knob 49 is rotated against the frictional contact of spring 50. If it is desired to shift the stylus longitudinally without raising it from the drum, then the left end of an arm 57, pivoted at 58 so as to be out of the vertical plane of arm 29, is moved upwardly by the operator's fingers to cause the short cam-like right end 59 to engage a lateral extension (not shown) of support 34 and force it down with the same result as if done by pin 37.

From the foregoing disclosure it is seen that I have provided an improved recording apparatus whereby fresh record paper may be not only conveniently and expeditiously placed in use but at the same time effectively brought into proper cooperative relation with the stylus, this improved combination being relatively economical in manufacture, maintenance and operation and insuring that a minimum amount of record paper will be used consistent with desired results without in any way impairing the positive and yet flexible operation of the apparatus or its precision qualities.

It will of course be understood that various changes in details of construction and arrangement of parts may be made by those skilled in the art without departing from the spirit of the invention as set forth in the appended claims.

I claim:

1. Recorder apparatus comprising, in combination, a rotatable hollow recorder drum having a longitudinal peripheral slot, a roll of record paper adapted to be disposed within said drum, a portion of the paper extending outwardly through said slot and around said drum and across said slot into overlapping relation with the portion of the paper extending immediately outwardly through said slot, and means movable with said drum for positively pressing and thereby directly tightly clamping the overlapped portions of said paper to the periphery of said drum longitudinally thereof, the clamped portions of paper being disposed directly between the drum and clamping means and said clamping means being movable away from the drum to release said pressing action and allow the paper to be freely unwound.

2. Recorder apparatus comprising, in combination, a hollow recorder drum having a longitudinal peripheral slot, a roll of paper adapted to be disposed within the drum and having a portion extending through said slot and around the surface of the drum and terminating adjacent said slot, and a holding down bar supported entirely by said drum and bridging over said slot to positively press and thereby directly tightly clamp the paper on to the drum at opposite longitudinal sides of said slot, the clamped portion of paper being disposed directly between the drum and clamping means.

ORVILLE S. PETERS.